United States Patent [19]

Perez

[11] Patent Number: 5,248,438
[45] Date of Patent: Sep. 28, 1993

[54] METHODS OF CONTROLLING SCALE FORMATION IN AQUEOUS SYSTEMS

[75] Inventor: Libardo A. Perez, Morrisville, Pa.

[73] Assignee: Betz Laboratories, Inc., Trevose, Pa.

[21] Appl. No.: 827,246

[22] Filed: Jan. 28, 1992

[51] Int. Cl.$^5$ ................................................ C02F 5/10
[52] U.S. Cl. .................................... 210/701; 210/698; 252/181; 252/389.1; 422/17; 422/19
[58] Field of Search ................................ 210/696–701; 252/180, 181, 387, 389.1; 422/14, 17, 19

[56] References Cited

U.S. PATENT DOCUMENTS

| | | |
|---|---|---|
| 4,749,550 | 6/1988 | Goldie et al. ............... 422/14 |
| 4,872,995 | 10/1989 | Chen et al. ............... 210/699 |
| 5,057,228 | 10/1991 | Breen et al. ............... 210/700 |
| 5,062,962 | 11/1991 | Brown et al. ............... 210/698 |
| 5,130,052 | 7/1992 | Kreh et al. ............... 210/698 |

Primary Examiner—Peter Hruskoci
Attorney, Agent, or Firm—Alexander D. Ricci; Steven D. Boyd

[57] ABSTRACT

The treatment of an aqueous system to inhibit scale formation with a polyepoxysuccinic acid scale inhibitor, an acrylic acid copolymer and a lanthanide ion blending agent.

3 Claims, No Drawings

METHODS OF CONTROLLING SCALE FORMATION IN AQUEOUS SYSTEMS

FIELD OF THE INVENTION

The present invention relates to the treatment of water to inhibit the formation of scale. More particularly, the present invention relates to a treatment for an aqueous system which comprises a polyepoxysuccinic acid scale inhibitor, an acrylic acid copolymer and a lanthanide ion blending agent.

BACKGROUND OF THE INVENTION

Although the present invention has general applicability to any given system where the formation and deposition of scale and in particular calcium scale is a potential problem, the invention will be discussed in detail as it concerns cooling water systems. The present invention relates to methods for inhibiting scale deposits and fouling in aqueous systems.

In industrial cooling systems, water such as from rivers, lakes, ponds, etc., is employed as the cooling media for heat exchangers. Such natural waters contain large amounts of suspended material such as silt, clay, and organic wastes. The cooling water from a heat exchanger is typically passed through a cooling tower, spray pond or evaporative system prior to discharge or reuse. In such systems, cooling is achieved by evaporating a portion of the water passing through the system. Because of the evaporation which takes place during cooling, suspended materials in the water become concentrated. Fouling materials from the feedwater or as a result of evaporative concentration can settle in locations of low flow rates and cause corrosion and inefficient heat transfer. Agglomerating agents such as polyacrylamides and polyacrylates have been used to agglomerate fine particles of mud and silt into a loose floc for removal. However, these flocs tend to settle in cooling tower basins and frequent cleaning is necessary to remove the settled flocs from the tower basins. Dispersants are typically employed to inhibit fouling caused by the adherence of such particles on heat transfer surfaces. Often such dispersants are copolymers of acrylic acid. For example polyacrylic acid, acrylic acid/1-allyloxy-2-propanol copolymer, acrylic acid/allyl hydroxypropylsulfonate ether sodium salt copolymer and acrylic acid/polyethylene glycol allyl ether copolymer.

The water employed in industrial cooling water systems also often contains dissolved salts of calcium, magnesium etc., which can lead to scale and sludge deposits. One of the most common scale deposits in cooling systems is calcium carbonate. It normally results from the breakdown of calcium bicarbonate, a naturally occurring soluble salt. Calcium carbonate has a relatively low solubility and its solubility decreases with increasing temperature and pH. Thus, the rate of calcium carbonate deposition increases with increasing pH and temperature.

Deposit control agents such as phosphates, phosphonates and polyacrylates are often used to inhibit calcium carbonate scale formation in industrial cooling water systems. These polyacrylates alone are not effective at high calcium concentrations because undesirable polyacrylate-calcium adducts are formed reducing efficacy. Although phosphonates are very efficient at controlling calcium carbonate scale formation, they can produce insoluble phosphonate-calcium complexes or calcium phosphate scale upon degradation. Further, current limits on phosphate discharge limit the acceptability of the use of phosphonates for water treatment.

Preventing the corrosion and scaling of industrial heat transfer equipment is essential to the efficient and economical operation of a cooling water system. Excessive corrosion of metallic surfaces can cause the premature failure of process equipment, necessitating down time for the replacement or repair of the equipment. Additionally, the buildup of corrosion products on heat transfer surfaces impedes water flow and reduces heat transfer efficiency thereby limiting production or requiring downtime for cleaning. Reduction in efficiency will also result from scaling deposits which retard heat transfer and hinder water flow. Scale can also cause rapid localized corrosion and subsequent penetration of metallic surfaces through the formation of differential oxygen concentration cells. The localized corrosion resulting from differential oxygen cells originating from deposits is commonly referred to as "under deposit corrosion".

The treatment of industrial waters to inhibit scale formation with polyepoxysuccinic acid (hereinafter PESA) is disclosed in U.S. Pat. No. 5,062,962 incorporated herein by reference. The general formula for PESA is:

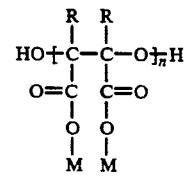

where n ranges from about 2 to 50, preferably, 2 to 25, M is hydrogen or a water soluble cation such as $Na^+$, $NH_4^+$ or $K^+$ and R is hydrogen, C1-4 alkyl or C1-4 substituted alkyl (preferably R as hydrogen). PESA is known to be an effective inhibitor for scale control. However, it was found that when PESA was employed in combination with acrylic acid copolymers commonly employed as dispersants, corrosion inhibitors or deposit control agents there was a decrease in efficacy of the scale inhibiting properties of PESA.

SUMMARY OF THE INVENTION

The present invention provides an effective method for inhibiting scale formation in aqueous systems by employing PESA in combination with an acrylic acid copolymer treatment. The method of the present invention enhances the efficacy of PESA and also avoids the interference between acrylic acid copolymer treatments and PESA. The method of the present invention was also found to inhibit corrosion on low carbon steel surfaces. The present invention provides a method for inhibiting scale formation in aqueous systems which is effective at conditions of high pH, high calcium concentration and high M alkalinity where conventional calcium control treatments lose efficacy. The present invention controls calcium scale formation and fouling of heat transfer surfaces without the formation of undesirable inhibitor-calcium complexes. Also, the method of the present invention does not employ phosphorous thereby eliminating the undesirable discharge of phosphorous containing compounds. The method of the present invention is effective at treating waters having low levels of calcium as well as those having high calcium levels.

The present invention is effective at inhibiting the deposition of scale forming materials such as calcium oxalate, calcium sulfate, barium sulfate as well as the more common calcium carbonate. The present invention is also effective at high pH calcium carbonate inhibition as required in paper mills.

The method of the present invention comprises treating industrial water with a combination of: a polyepoxysuccinic acid of the general formula

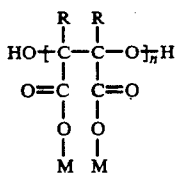

where n ranges from about 2 to 50, preferably 2 to 25, and M is hydrogen or a water soluble cation such as $Na^+$, $NH_4^+$ or $K^+$ and R is hydrogen, C1–4 alkyl or C1–4 substituted alkyl (preferably R as hydrogen); an acrylic acid copolymer which can function as a dispersing agent, a corrosion control agent or a deposit control agent; and lanthanide ion(s). Exemplary acrylic acid copolymers include polyacrylic acid and (meth)acrylic acid/allyl ether copolymers.

In the present invention, the polyepoxysuccinic acids are added to aqueous systems at substoichiometric levels to inhibit scale formation, the acrylic acid copolymer is added to avoid fouling caused by the adherence of particles to heat transfer surfaces and the lanthanide ions are added in amounts sufficient to inhibit interference between the acrylic acid copolymer and the polyepoxysuccinic acid.

DESCRIPTION OF THE PREFERRED EMBODIMENTS

The present invention pertains to a novel method of inhibiting the formation of scale such as calcium scale from aqueous systems and inhibiting the fouling caused by the adherence of particles to heat transfer surfaces in an aqueous system. Specifically, the method of the present invention comprises adding to an aqueous system a treatment solution comprising a combination of: a polyepoxysuccinic acid of the general formula

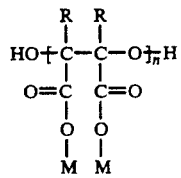

where n ranges from about 2 to 50, preferably 2 to 25, and M is hydrogen or a water soluble cation such as $Na^+$, $NH_4^+$ or $K^+$ and R is hydrogen, C1–4 alkyl or C1–4 substituted alkyl (preferably R as hydrogen); an acrylic acid copolymer such as a (meth)acrylic acid/allyl ether copolymer; and a lanthanide ion.

Polyepoxysuccinic acids are known to provide calcium scale inhibition comparable to prior art phosphates, phosphonates and polyacrylates without the recognized limitations of these prior art treatments. Polyepoxysuccinic acids are effective in all water systems, and particularly effective in aqueous systems having relatively high Langelier Saturation Index (LSI) numbers, that is in the range of 2.5 to 3.0. U.S. Pat. No. 5,062,962 (incorporated herein by reference) outlines a method of preparing the polyepoxysuccinic acid material of the present invention. The treatment levels of polyepoxysuccinic acid added to an aqueous system can range from about 25 parts per billion up to about 500 parts per million. The preferred treatment levels range from about 5 part per million up to about 100 parts per million. The concentration of polyepoxysuccinic acid necessary to provide effective scale control will vary from system to system. The treatment level will vary in part, with changes in temperature, pH, and LSI. However, in all cases, the concentration of polyepoxysuccinic acid added to an aqueous system in accordance with the present invention is at substoichiometric concentrations. That is, the concentration of polyepoxysuccinic acid added is much lower than the concentration of the scale forming material in the system to be treated.

The acrylic acid copolymers of the present invention are those known to be effective in aqueous systems for corrosion inhibition, scale control and as dispersants. Exemplary acrylic acid copolymers include polyacrylic acid and (meth)acrylic acid/allyl ether copolymers as described in commonly assigned U.S. Pat. No. 4,872,995 incorporated herein by reference. (Meth)acrylic acid-/allyl copolymers described therein include acrylic acid/1-allyloxy-2-propanol (AA/AOP), acrylic acid-/allylhydroxypropylsulfonate ether sodium salt (AA-/AHPSE) and acrylic acid/polyethyleneglycol allyl ether (AA/PEGAE).

Such acrylic acid copolymers are known to have a variety of uses in the treatment of aqueous systems. However, when employed in combination with the known scale control agent PESA there is a marked decrease in the effectiveness of the PESA scale control agent. It was found that when a lanthanide ion was added to an aqueous system in combination with PESA and an acrylic acid copolymer the efficacy of the PESA was actually increased, the interference between the PESA and the acrylic acid copolymer was inhibited and also corrosion on low carbon steel surfaces decreased. The lanthanide ions of the present invention include any member of lanthanide series (the rare earth elements) preferably lanthanum, praseodymium and neodymium. The lanthanide ion may be added to an aqueous system in the form of their salts preferably their chloride salts. The lanthanide ions can be added in concentration ranges of from about 2 parts per billion up to about 25 parts per million, preferably from about 0.1 to 3.0 parts per million.

The present invention will now be described with reference to a number of specific examples which are to be regarded solely as illustrative and not as restricting the scope of the present invention.

EXAMPLES

Static testing was undertaken to evaluate the calcium carbonate inhibition activity of polyepoxysuccinic acid alone as well as in combination with lanthanum ions, AA/AHPSE and AA/AHPSE plus lanthanum ions. In the testing two different molecular weights of AA-/AHPSE were tested: AA/AHPSEI has a lower molecular weight than AA/AHPSEII. The test conditions were: pH=9.0, Temperature=70° C., 1102 ppm $Ca^{2+}$ as $CaCO_3$, 1170 ppm $CO^{2-}$ as $CaCO_3$, LSI=3.2, duration 18 hours.

Table 1 summarizes the test results.

TABLE 1

| Treatment | % Inhibition |
|---|---|
| 2 ppm PESA | 25.1 |
| 5 ppm PESA | 58.8 |
| 10 ppm PESA | 87.2 |
| 1 ppm La | 22.1 |
| 2 ppm PESA + 1 ppm La | 40.1 |
| 5 ppm PESA + 1 ppm La | 62.0 |
| 5 ppm PESA + 5 ppm AA/AHPSE I | 48.1 |
| 10 ppm PESA + 5 ppm AA/AHPSE I | 64.3 |
| 5 ppm PESA + 5 ppm AA/AHPSE I + 1 ppm La | 65.2 |
| 10 ppm PESA + 5 ppm AA/AHPSE I + 1 ppm La | 91.8 |

All AA/AHPSE concentrations are given as active polymer concentration.

As shown in Table 1, PESA alone was an effective calcium carbonate control agent. Lanthanum by itself does not appear to have a significant effect on the activity of the PESA. When PESA and AA/AHPSE are combined there is a decrease in effectiveness as evidenced by the decrease in % inhibition. When the lanthanum is added to a combination of PESA and AA/AHPSE there is a significant improvement in the % inhibition.

At the conclusion of static testing, dynamic recirculator testing was undertaken. The recirculator system is designed to provide a realistic measure of the ability of a treatment in accordance with the present invention to inhibit corrosion and fouling under heat transfer conditions. In this system, treated water is circulated by a centrifugal pump through a corrosion coupon by-pass rack, into which corrosion coupons (Admiralty, brass or low carbon steel) are inserted, and past a mild steel or 316 stainless steel heat exchanger tube contained in a Plexiglas (trademark of Rohm and Haas Co.) block. The heat exchanger tube is fitted with an electrical heater so that the heat load on the tube can be varied and controlled in the 0 to 16,000 BTU/ft$^2$/hour range. The water velocity passed the corrosion coupons and heat exchanger tubes is equivalent at any given flow rate and can be controlled anywhere from 0 to 4.5 ft/sec.

The pH and temperature of the recirculating water are automatically controlled. The treated water is prepared by chemical addition to deionized water. Provisions for continuous makeup and blowdown are made by pumping fresh treated water from supply tanks to the sump of the unit, with overflow from the sump serving as blowdown. The total system volume is about 12 liters. Tables 2 and 3 summarize the results of tests run at different conditions of M alkalinity.

TABLE 2

Dynamic Testing

Conditions:

| | |
|---|---|
| 600 ppm Ca$^{2+}$ as CaCO$_3$ | M - Alk = 250 |
| 200 ppm Mg$^{2+}$ as CaCO$_3$ | pH = 8.5 LSI = 2.2 |
| 406 ppm NaHCO$_3$ | Heat Flux = 15600 Btu/hr. ft$^2$ |
| 50 ppm SiO$_2$ | Sol. velocity = 4 gpm |
| 3 ppm TTA | Temperature = 120° F. |
| | 7 days run |

| Treatment | Heat Transfer Surface | Results | Corrosion on LCS (mpy) |
|---|---|---|---|
| 15 ppm PESA | Admiralty | Clean | NO LCS |
| 15 ppm PESA + 15 ppm AA/AOP | " | Heavy Deposit | " |
| 15 ppm PESA + 15 ppm Coag 106 | " | Heavy Deposit | " |
| 15 ppm PESA + 15 ppm AA/AHPSE I | " | Heavy Deposit | " |
| 15 ppm PESA + 15 ppm AA/AHPSE II | " | Heavy Deposit | " |
| 15 ppm PESA + 15 ppm AA/AOP + 2 ppm Ni$^{2+}$ | " | Heavy Deposit | " |
| 15 ppm PESA + 15 ppm AA/AOP + 2 ppm CO$^{2+}$ | " | Heavy Deposit | " |
| 15 ppm PESA + 15 ppm AA/AOP + 2 ppm Mn$^{2+}$ | " | Heavy Deposit | " |
| 15 ppm PESA + 15 ppm AA/AOP + 2 ppm Mo | " | Heavy Deposit | " |
| 15 ppm PESA + 15 ppm AA/AOP + 1 ppm La$^{3+}$ | Admiralty | Clean | NO LCS |
| 15 ppm PESA + 15 ppm AA/AHPSE I + 1 ppm La$^{3+}$ | " | Clean | " |
| 15 ppm PESA (2 days run) | LCS | Heavy Corrosion | 5.14 |
| 15 ppm PESA + 2 ppm Zn$^{2+}$ | LCS | Slight Deposit | 0.20 |
| 25 ppm PESA + 2 ppm Zn$^{2+}$ | LCS | Moderate Deposit | 0.50 |
| 15 ppm PESA + 5 ppm AA/AHPSE I + 1 ppm La$^{3+}$ | LCS | Clean | 0.64 |
| 10 ppm PESA + 5 ppm AA/AHPSE I + 1 ppm La$^{3+}$ | LCS | Clean | 0.64 |
| 15 ppm PESA + 5 ppm AA/AHPSE I + 1 ppm Nd$^{3+}$ | LCS | Clean | 1.00 |

All AA/AHPSE concentrations are given as active polymer
Coag 106 is a polyacrylic acid available from Betz Labs of Trevose, PA

TABLE 3

Dynamic Testing

Conditions:

| | |
|---|---|
| 450 ppm Ca$^{2+}$ as CaCO$_3$ | M - Alk = 400 |
| 200 ppm Mg$^{2+}$ as CaCO$_3$ | pH = 8.8 LSI = 2.6 |
| 580 ppm NaHCO$_3$ | Heat Flux = 8000 Btu/hr. ft$^2$ |
| | Sol. velocity = 4 gpm |

TABLE 3-continued

| Dynamic Testing | |
|---|---|
| 300 ppm SO$_4$ | Temperature = 120° F. |
| 50 ppm SiO$_2$ | 7 days run |
| 3 ppm TTA | LCS Heat Transfer Surface |

| Treatment | Results | Corrosion Rate on LCS Coupons (mpy) |
|---|---|---|
| 25 ppm PESA + 10 ppm AA/AOHBA + 2 ppm Zn$^{2+}$ | Film of deposit Moderate Corrosion | 0.85 |
| 25 ppm PESA + 10 ppm AA/AHPSE II + 2 ppm Zn$^{2+}$ | Film of deposit High Turbidity | 0.20 |
| 25 ppm PESA + 10 ppm AA/AHPSE I (4 days run) | Heavy Deposit and Corrosion | 9.60 |
| 25 ppm PESA + 10 ppm AA/AHPSE I + 2 ppm Zn$^{2+}$ | No scale on tube High turbidity | 0.57 |
| 25 ppm PESA + 10 ppm AA/AHPSE I + 1 ppm La$^{3+}$ | Clean | 0.43 |
| 15 ppm PESA + 5 ppm AA/AHPSE I + 1 ppm La$^{3+}$ | Clean | 0.58 |
| 25 ppm PESA + 5 ppm AA/AHPSE I + 1 ppm Pr$^{3+}$ | Clean | 0.53 |

All AA/AHPSE concentrations are given as active polymer.
AA/AOHBA is acrylic acid/allyloxy-3-hydroxybutanoic acid.

As can be seen from Tables 2 and 3, the combination of the present invention inhibits deposition on the heat transfer surfaces as well as inhibiting corrosion on low carbon steel. Ions such as cobalt, nickel, manganese and molybdate failed to produce the results of the present invention.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true scope and spirit of the present invention.

What is claimed is:

1. A method of increasing the scale control activity of substoichiometric amounts with respect to scale forming materials of a polyepoxysuccinic acid added to inhibit scale formation in combination with a dispersing amount of copolymer of acrylic acid selected from the group consisting of acrylic acid and (meth)acrylic acid/allyl ether copolymers added to avoid fouling caused by particles in an aqueous system which comprises adding a sufficient amount for the purpose of inhibiting interference between said polyepoxysuccinic acid and said copolymer of acrylic acid of a lanthanide ion to the aqueous system.

2. A method of increasing the scale inhibiting activity of substoichiometric amounts with respect to scale forming materials of a polyepoxysuccinic acid added to inhibit scale formation in aqueous systems in combination with an acrylic acid copolymer selected from the group consisting of acrylic acid and (meth)acrylic acid/allyl ether copolymers added to avoid fouling caused by particles which comprises adding a sufficient amount for the purpose of inhibiting interference between said polyepoxysuccinic acid and said copolymer of acrylic acid of a lanthanide ion to the aqueous system.

3. A method of inhibiting the deposition of scale in aqueous systems by adding a substoichiometric amount with respect to scale forming materials of polyepoxysuccinic acid of the general formula

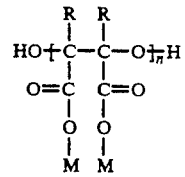

wherein n ranges from 2 to 50, M is hydrogen or a water soluble cation and R is hydrogen, C1-4 alkyl or C1-4 substituted alkyl to inhibit said deposition of scale in combination with a dispersing amount of an acrylic acid copolymer selected from the group consisting of acrylic acid and (meth)acrylic acid/allyl ether copolymers added to avoid fouling caused by particles comprising adding a lanthanide ion in an amount sufficient to inhibit interference between said acrylic acid and said polyepoxysuccinic acid.

* * * * *